P. M. KLING.
BOLT.
APPLICATION FILED MAR. 2, 1912.
1,075,980.
Patented Oct. 14, 1913.
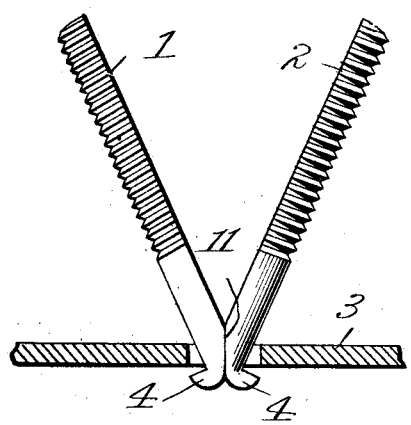
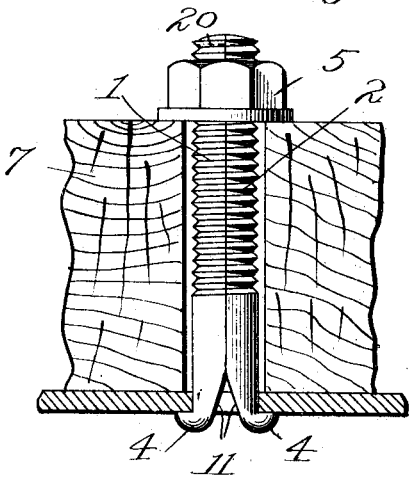
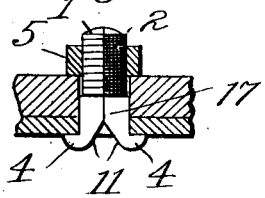
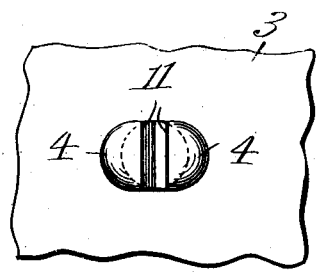
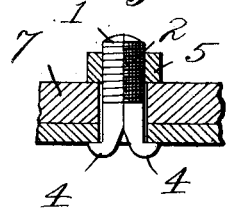
Witnesses:
Ray J. Ernst
H. Alfred Jencke
Inventor
Peter M. Kling
By his Attorneys

UNITED STATES PATENT OFFICE.

PETER M. KLING, OF ELIZABETH, NEW JERSEY.

BOLT.

1,075,980.  Specification of Letters Patent.  Patented Oct. 14, 1913.

Original application filed June 23, 1911, Serial No. 634,882. Divided and this application filed March 8, 1912. Serial No. 681,127.

*To all whom it may concern:*

Be it known that I, PETER M. KLING, a citizen of the United States, and a resident of Elizabeth, in the county of Union and State of New Jersey, have invented certain new and useful Improvements in Bolts, of which the following is a full and clear specification, illustrated in the accompanying drawings, the novel features being more particularly pointed out in the annexed claims.

My invention relates to bolts by means of which objects may be attached to sheet metal plates or to pipes into which, owing to the thinness of the metal, threads cannot be cut and where it is impossible to put the bolt through the hole in the metal from the rear. Bolts of this kind may be for instance used in modern office buildings, where all the doors and window trimmings are made out of sheet metal or in modern all steel railroad cars, where it is often desirable to attach trimmings to the sheet metal walls after the wall plating has been mounted in the car. Moreover its application is equally broad for joining together piping or tubing to form railings, gates or the like, where at the T- and similar connections no tight joints are required. In all such cases, it has been difficult heretofore to fasten or lock the head of a screw bolt in such metal, without drilling an unduly large hole through the metal.

My invention relates to a bolt for the purposes above mentioned in which the bolt head can be fastened or locked back of the sheet metal after putting the bolt through a hole in the sheet metal not substantially larger than the diameter of the bolt itself, so that when the object to be fastened to the sheet metal has been clamped tight against the metal by the nut the bolt will seat itself tight in the hole through the metal.

In particular my present invention refers to a form of bolt illustrated and broadly characterized in the Patent No. 1,055,330, granted to me on March 11, 1913, from which the present application has been divided. The broad principle involved in aforesaid patent and my present application refers to a screw bolt comprising two complementary bolt sections, each having a head offset to one side oppositely to the direction in which the head of the other section is offset, and each section having its cross sectional area adjacent to said head smaller than the area of the remainder of the bolt section, to permit said heads when laterally alined to enter the hole not substantially larger than the diameter of the bolt, said heads moving away from each other when the two complementary bolt sections are assembled to receive the nut. My present application covers more particularly the forms illustrated in Figures 19 to 25 of aforesaid patent.

In the accompanying drawings, Fig. 1 is a side elevation of the bolt in the position in which it is inserted through the hole in the sheet metal. Fig. 2 is a like view showing the bolt and the object to be supported by the bolt attached to the sheet metal. Fig. 3 is a bottom view of the structure shown in Fig. 2. Fig. 4 is a modification of the bolt shown in Fig. 2, the bolt being provided with a square neck. Fig. 5 is a plan view of the bolt shown in Fig. 4. Fig. 6 is a modification of the bolt shown in Fig. 4, and Fig. 7 is a plan view thereof.

The bolt illustrated in Figs. 1 to 3 consists of two complementary threaded portions or sections 1 and 2, each section having at its end which is to be inserted in the sheet metal 3, a nose or head 4 which is offset from the cylindrical surface of the section a suitable distance as shown. Moreover one of the characteristic features of the bolt which is also peculiar to the forms shown in aforesaid patent is that each of the two bolt sections has its cross sectional area adjacent to the head 4 smaller than the cross sectional area of the remainder of the bolt section. In the particular forms shown in the present application it will be noted that the head 4 of each section is offset in a direction at right angles to the plane in which the bolt is divided into the two sections and the two surfaces at which the bolt sections meet when they are assembled are tapering away from each other as shown at 11 for instance in Figs. 1, 2 and 3. Thereby, as previously stated, the cross sectional area of each section adjacent to the head 4 is smaller than the cross sectional area of the remainder of the bolt section. In this particular case the diameter of each section at right angles to the dividing plane of the two sections is smaller adjacent to the head than elsewhere. By this construction the result is obtained that when the bolt is inserted and the two bolt sections are tilted away from each other during the insertion so that the tapering surfaces 11 touch each other as shown in Fig. 1, the two heads of the two sections approach each other sufficiently to permit the insertion of the two sections into the hole of metal 3, if desired simultaneously. When the two sections are then assembled to receive the nut the heads 4 separate and lock their respective sections behind the metal. By suitably dimensioning the length of the offset of heads 4 the hole in the sheet metal may be made of such small dimension that the bolt is locked tight in the hole when the two sections are assembled to receive the nut. A bottom view of the bolt in attached position is shown in Fig. 3 and Fig. 2 shows how the bolt is capable of holding a thick block of wood 7 to the sheet metal.

It is often desirable to use socalled square neck bolts to prevent turning of the bolt in the material to which the bolt is attached. To make the form of bolt illustrated in Figs. 1 to 3 available for square neck bolts I may divide the bolt into its two complementary sections on a plane running either diagonally through the square neck as shown in Figs. 4 and 5 or parallel to and midway between two opposite sides 17 of the square neck as shown in Figs. 6 and 7. Otherwise the construction of the bolt with respect to the slanting surfaces 11 may be the same or similar to that shown in Figs. 1 to 3. It is of course obvious that similar to the manner in which I have shown in my aforesaid original application means for preventing the bolt from turning when the nut is attached, such as for instance a slot 20 in the upper end of the bolt, I may also in the forms of bolts shown in the present application, provide a slot or other suitable means at the upper end of the bolt for holding the assembled sections with a suitable tool while the nut is attached, to prevent them from rotating.

What I claim is:

1. A screw bolt of the character described, comprising two complementary bolt sections, each having a head offset substantially at right angles to the plane in which the bolt is divided into said sections, and each head being offset oppositely to the other head, the dimension of each section at right angles to the direction of said plane being smaller adjacent to its head than at the remainder of the section to permit said heads when registering to enter a hole not substantially larger than the diameter of the bolt, said heads moving away from each other when the two complementary bolt sections are assembled to receive the nut.

2. A screw bolt adapted to be locked in sheet metal, comprising two complementary bolt halves, each having a head offset to one side and oppositely to the direction in which the head of the other half is offset, the contacting surfaces of the two heads tapering away from each other toward the ends, said bolt heads when touching each other at said tapered surfaces adapted to pass simultaneously through a hole in the sheet metal not larger than the bolt diameter, said heads moving away from each other and sliding back of the sheet metal when the two complementary bolt halves are assembled to receive the nut.

PETER M. KLING.

Witnesses:
H. ALFRED JANKE,
M. G. CRAWFORD.